Nov. 24, 1970   J. W. McLEAN ETAL   3,541,688
DENTAL RESTORATIONS
Filed Oct. 25, 1968   2 Sheets-Sheet 1
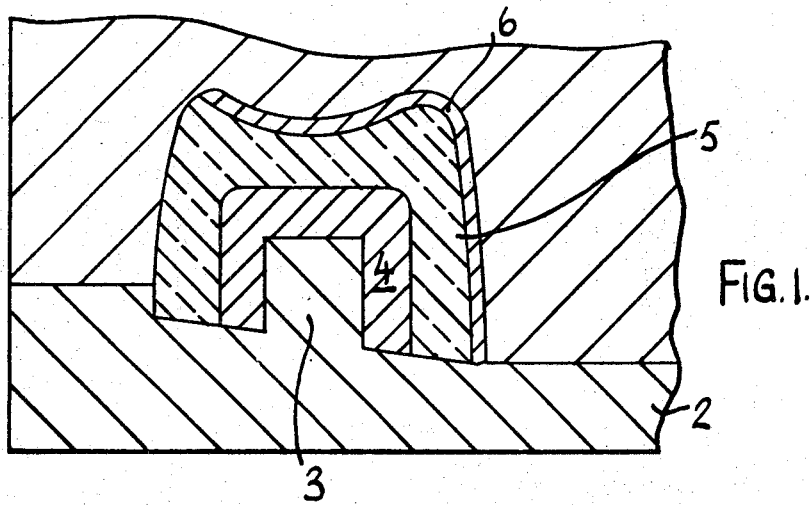
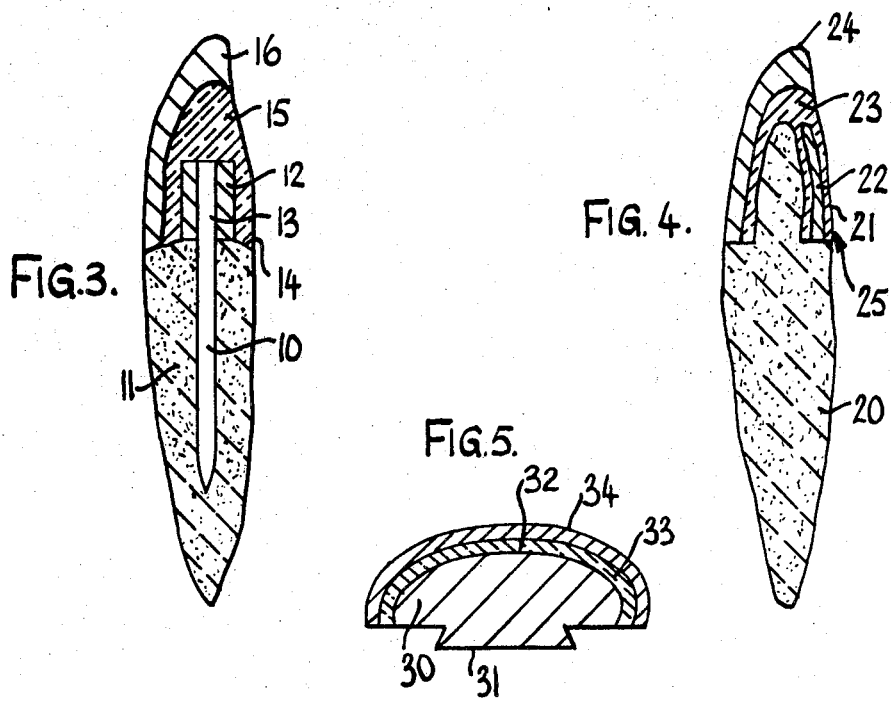
INVENTORS
JOHN WALFORD McLEAN
THOMAS HENRY HUGHES
BY Jacobs & Jacobs

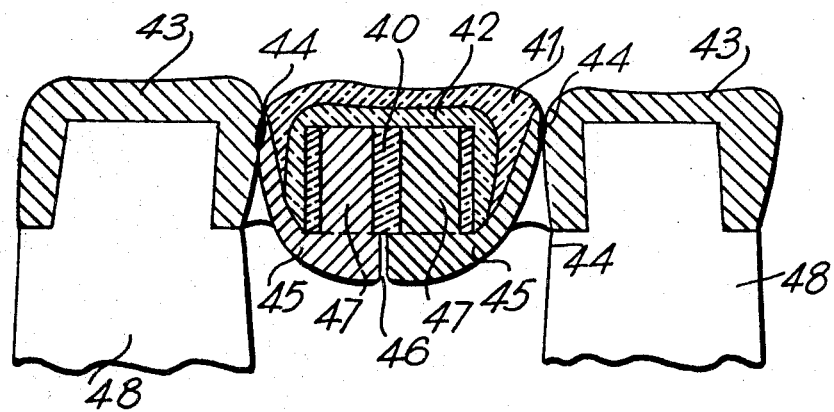
Fig. 2.
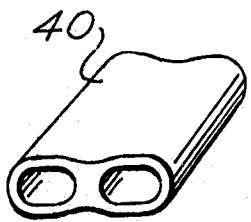
Fig. 2.ª

United States Patent Office 3,541,688
Patented Nov. 24, 1970

1

3,541,688
DENTAL RESTORATIONS
John Walford McLean, London, and Thomas Henry Hughes, Letchworth, England, assignors to National Research Development Corporation, London, England, a corporation of the United Kingdom
Continuation-in-part of application Ser. No. 364,896, May 5, 1964. This application Oct. 25, 1968, Ser. No. 770,627
Int. Cl. A61c 13/00
U.S. Cl. 32—8         11 Claims

ABSTRACT OF THE DISCLOSURE

Dental restorations, including artificial teeth, crowns and bridges, comprise a preformed element of recrystallized alumina imbedded in a body of dental porcelain fused to the alumina so as to define the external contour of the restoration, the element being situated in the body so as to be interposed between a principal source of rupturing forces, applied to the restoration when in use and the main mass of the porcelain body; the alumina may form a reinforcing core supporting the restoration in the mouth or on a plate or bridge structure, thus taking the supporting forces applied to the restoration, or may be placed to receive high biting forces to which the tooth may be subject. The dental porcelain used is preferably aluminous porcelain.

---

This application is a continuation-in-part of our application Ser. No. 364,896, filed May 5, 1964.

The invention relates to the construction of denture work and dental restorations, e.g. artificial teeth, crowns and bridges.

The principal material commonly used for this purpose is known as dental porcelain, and is conventionally composed of a mixture of feldspar, silica and kaolin in various proportions together with a small amount of a fluxing material, the mixture being fused and then ground to a frit, which is moulded to the desired shape and re-fused upon use.

Artificial teeth are normally manufactured from porcelains having a high fusing temperature, e.g. 1300° C., and platinum or gold clad pins are normally fired or welded into the back of the teeth to form attachments to the denture base.

Porcelain jacket crowns are constructed on platinum matrices using suitably pigmented porcelain powder which is generally bonded with distilled water to facilitate moulding. The platinum matrix with the hand moulded jacket crown is fired in a furnace, ground to shape and then refired to produce a glaze similar to human dental enamel. Dental inlays are produced in a similar manner using a platinum matrix or a refractory mould.

Dental porcelain has the disadvantage of mechanical strength limitations. The strength of this porcelain, which is generally measured in terms of the modulus of rupture, is very low e.g. 4000–12,000 pounds per square inch. This lack of mechanical strength makes the material unsuitable for use in areas of the mouth where high stress concentrations are prevalent. The brittle nature of dental porcelain currently used is also manifest by the high breakage rate of artificial teeth on denture plates when they are accidentally dropped on to hard surfaces and by the fractures which occur in dental crowns subjected to heavy biting forces.

Attempts have been made to improve the strength of dental porcelain by firing water bonded powder in a vacuum thus eliminating entrapped air bubbles in the fired porcelain. Other techniques to reinforce dental porcelain involve the use of a platinum-palladium-gold alloy with a melting range of 1150–1175° C. to construct a reinforced core or backing onto which a dental porcelain of a similar coefficient of thermal expansion is fired. This latter technique has been used to construct dental crowns and bridgework permanently cemented to existing teeth in the mouth.

In general, the fragility of dental porcelain has made necessary the extensive use of metal reinforcements of one form or another, and this in turn has led to a number of problems.

For aesthetic reasons, it is clearly desirable that the presence of the reinforcing metal be hidden as far as possible, but this presents great difficulties since firstly, the relatively translucent character of conventional dental porcelains requires a substantial covering layer of the latter if the darkening effect of the metal is to be obscured, and secondly, in a number of cases, the reinforcement is required just where the presence of substantial thicknesses of porcelain is impracticable, for example, close to the incisal edges of anterior teeth.

In the first case, the thickness of porcelain necessary may lead, in the case of jacket crowns, to removal of excessive material from the tooth to which the crown is to be fitted in order to make room for the increased thickness of the crown; and this in turn may lead to the death of the tooth pulp. On the other hand, if excessive material is not removed, the size of the resulting crown may make it impossible to achieve a proper bite relationship.

In the second case, some exposure of metal becomes inevitable, thus seriously detracting from the aesthetic value of the restoration.

Moreover, the use of metal in conjunction with conventional porcelain presents considerable technical and economic problems. It requires the dental technician to be skilled both in the ceramic and the metal casting arts, and the metals used must be resistant to oral fluids, readily workable, and have suitable melting points and coefficients of expansion. This dictates the extensive use of gold and noble metal alloys, which are of course extremely expensive.

The primary object of the present invention is to provide dental restorations having a high resistance to fracture and in which the necessity of costly and aesthetically undesirable metallic reinforcement in or proximate the exposed surfaces of the completed restoration is avoided, and the use of metal working techniques may be, reduced or avoided, by incorporating in a porcelain body comprised by the restoration, and defining a tooth shape or part thereof, a preformed element of recrystallized alumina to which the porcelain is fired, this element being so situated in the porcelain body as to be interposed between the main mass of the porcelain body and a principal source of rupturing forces which will be applied to the restoration when in position in the mouth. Such rupturing forces will generally occur where the exterior of the restoration is subjected to heavy biting forces from other teeth, or where the restoration is supported in the mouth, due to limitation of the bearing area through which loads may be transferred, or imperfect mounting leading to localization of stress transfer. By recrystallized alumina, we intend the material variously known to ceramists as sintered alumina or recrystallized alumina.

Thus a further object of the invention is to provide artificial teeth in which the porcelain is fused onto a preformed supporting core of recrystallized alumina, with the result that the forces supporting the teeth against biting forces are transmitted to the porcelain through the alumina core.

A further object of the invention is to provide post crowns in which the post is surrounded by a tubular element of recrystallized alumina, and the porcelain is fired onto this element, thus ensuring distribution of the very high localized forces which may be transmitted from the post to the crown at their interface.

A further object of the invention is to provide jacket crowns in which the porcelain is fused to a recrystallized alumina backing imbedded in the palatal aspect of the crown, whereby heavy biting forces on the palatal aspect of the crown are applied to the alumina backing, and the backing may extend close to the incisal edge of the crown without aesthetic penalties.

A further object of the invention is to provide dental restorations in which the ceramic elements may be attached to metal backings in such a manner that the supporting forces are not transmitted direct to the porcelain, whilst an improved bond with the metal may be obtained, by bonding the metal to the alumina element.

These and further objects of the invention will become apparent from the following description of preferred embodiments of the invention, in which reference will be made to the accompanying diagrammatic drawings in which:

FIG. 1 is a vertical cross-section of a tooth mould containing an artificial posterior tooth incorporating a preformed recrystallized alumina core made by the method of the invention, FIG. 2 is a sectional view showing how non parallel bridge abutments may be connected using a bridge pontic reinforced by an alumina element, FIG. 2a is a perspective view of the recrystallized alumina reinforcing element used in the structure of FIG. 2, FIG. 3 shows in vertical cross-section a post crown incorporating an alumina tube fitted to the root of a human tooth, FIG. 4 shows in vertical cross-section a jacket crown similarly fitted, FIG. 5 is a horizontal cross-section of an anterior veneer facing for bridgework.

Broadly speaking, restorations according to the invention comprise a preformed element or core of recrystallized alumina suitably located in a mass of dental porcelain in which it is imbedded, the porcelain having been fired with the element in place so that the porcelain is fused to the element. The element is so located in the porcelain body that when the finished restoration is in use high local forces which might cause rupture of a similar body of solely porcelain construction are applied to the alumina element rather than to the porcelain. Thus in an artificial tooth, the alumina element may be in the form of a central supporting core through which the tooth is supported in the mouth, the supporting forces being transmitted to the tooth through this core. In a post crown, a tubular element may be used surrounding the post and accepting the high local supporting forces that may be applied by the latter when biting forces are applied to the crown. In the case of a jacket crown subjected ho high biting forces on its palatal aspect, the element may be in the form of a backing imbedded in this aspect of the crown.

To discuss first the raw materials used in producing the restorations of the present invention, recrystallized alumina elements are prepared by moulding particulate alumina to a desired shape and firing it at a temperature somewhat below that sufficient to cause fusion.

Although the exact nature of the sintering and recrystallization process is not entirely certain, it appears that during firing the following steps occur. First, a welding effect occurs at the points of contact between adjacent oxide particles, giving rise to a lensing effect, as normally occurs in sintering processes. Migration of atoms then takes place from one particle to the other, resulting in a shift in the particle boundaries, or "recrystallation." During recrystallization, the shift in grain boundaries results in the formation of a closely interlocking crystalline structure of considerable strength, the improved packing of the particles resulting in shrinkage of the oxide mass. The resulting recrystallized oxide has mechanical properties much superior to those of dental porcelain which are limited by the inferior mechanical characteristics of the glass phase.

The firing temperature required is in the region of 1750° C., for pure alumina, but by reducing the purity by the addition of silica the firing temperature required may be reduced, falling to 500° C., for 80% alumina and to 1300° C., for compositions containing only 60% alumina, the balance being essentially silica. Such adulteration does somewhat reduce the strength of the fired material and it is preferred to use alumina of a high degree of purity, an alumina content of 97.5% being typical. Normal ceramic grades of alumina are suitable: these are readily available in this degree of purity, the balance apart from alumina generally comprising minor quantities of silica, titania, iron oxide and fluxing agents such as alkaline earth silicates. Ceramic pigments may be incorporated in small quantities to assist in matching natural tooth shades.

Those skilled in the ceramic art will be familiar with the technique of preparing recrystallized alumina articles, and will find no difficulty in the selection of suitable raw materials and firing times and temperatures. For the purpose of the present invention, the only special precautions that need be taken are to insure the absence of such impurities as will impart undesirable discoloration to the fired product or which will reduce its strength to a marked degree. However, a suitable technique of preparing recrystallized alumina elements is described below by way of example.

A mixture of 10% by weight of methyl cellulose and the balance water was made as follows. The methyl cellulose was mixed with half the required amount of water and heated to 80° C. for five to ten minutes with continuous stirring until it was wetted. The mixture was cooled to 20° C. when the remainder of the water was gradually added until dispersion of the methyl cellulose was complete.

The alumina and prepared methyl cellulose gel may then be mixed in various proportions according to the nature of the alumina to obtain a mouldable mass; in this example 200 grams of alumina were mixed with 30 grams of methyl cellulose gel. To facilitate release from the mould and to improve the moulding characteristics a suitable releasing agent, which agents are well known in the art, may be added to the mixture. A suitable proportion is 30 ml. of agent to 200 grams alumina. The mixture was then moulded to the required shape. After release from the mould, the moulded alumina was first dried slowly in an oven at 200° C. and then heated to the required firing temperature.

This procedure was conducted twice, firstly with alumina of 95% purity and secondly with alumina of 85% purity.

Articles moulded from alumina of 95% purity, the impurities being mainly silica with minor quantities of titania, iron oxide and fluxing agents such as alkali or alkaline earth silicates, were heated for two hours at 1650° C. Comparative properties of the material thus obtained and of dental porcelain are illustrated in the following table.

| Physical properties | Recrystallized alumina | Porcelain |
|---|---|---|
| Tensile strength, lb./sq. in | 17,200 | 5,000 |
| Compressive strength, lb./sq. in | 316,000 | 50,000 |
| Young modulus, lb./sq. in | 46.1×10⁶ | |
| Modulus of rupture, lb./sq. in | 55,000 | 3,700–12,000 |
| Coefficient of expansion: | | |
| 0–200° C.×10⁶/° C | 6.2 | 6.4–7.8 |
| 0–400° C.×10⁶/° C | 6.7 | |
| 0–600° C.×10⁶/° C | 7.1 | |
| 0–800° C.×10⁶/° C | 7.5 | |
| 0–1,000° C.×10⁶/° C | 7.9 | |
| Thermal conductivity, 100° C., joule cm./cm.²/sec./° C | 0.162 | 0.010 |
| Water absorption, percent | Nil | 0–2 |
| Hardness Moh's scale | 9 | |
| Rockwell C scale | 72 | 42 |
| Vickers scale at 10 kg. load VPN | 1,200 | 430 |

The coefficient of expansion of human teeth is in the order of $11.4 \times 10^{-6}/°$ C.

Articles moulded from alumina of 85% purity, the impurities being mainly silica with minor quantities of titania, iron oxide and fluxing agents such as alkali or alkaline earth silicates, were fired for two hours at 1500° C. and were found to be of only slightly inferior physical properties to the recrystallized alumina in the above table.

The procedure was repeated using a mixed oxide consisting of approximately 60% alumina and about 40% silica with minor proportions of impurities such as titania, iron oxide, and fluxing agents. The mixed oxide was heated for 2 hours at 1300° C.

The dental porcelain in which the alumina elements are imbedded may be a known dental feldspathic porcelain similar to that normally used in the production of porcelain restorations. Such porcelains are well known and they and their physical properties are fully described in the literature on the subject. However, it is preferred to make use of a porcelain henceforward referred to in the specification and claims as aluminous porcelain. This porcelain is fully described in our copending application Ser. No. 400,771 filed Oct. 1, 1964. Briefly, this procelain comprises an unfired mixture of a reinforcing material of particulate crystalline refractory oxide of a size of up to 200μ, and consisting of alumina with a matrix forming material consisting of feldspar, borosilicate glass or dental porcelain, the mixture containing between about 40% and 70% of refractory oxide, and said matrix forming material having a coefficient of expansion in the same range as said refractory oxide.

This porcelain has superior physical properties as compared with conventional feldspathic porcelains, and is greatly more resistant to fracture: when utilized in the present invention, the resulting restorations are in practice substantially unbreakable.

Referring now to FIG. 1 of the drawings, a metal mould made in two sections 1 and 2 is constructed with a metal spigot 3 projecting into the mould cavity. A preformed recrystallized alumina core 4 of 1.5 to 2.5 millimetres thickness depending on the size of the tooth and manufactured as described above is slipped onto the spigot 3. The core should fit the spigot with a tolerance of about 0.01 inch. A veneer 6 of feldspathic enamel is first applied to the inner surface of the mould section 1. Dental porcelain or aluminous porcelain containing a suitable pigment, and admixed if necessary with an inorganic binder, is then charged into the mould to form a layer 5 preferably of thickness 0.7 to 1.0 millimetre around the alumina core. The two halves of the mould are then closed in a hot press and the complete tooth fired and completed by standard dental manufacturing methods, after which it may be mounted on a denture plate or a bridge substructure within the mouth. This method is particularly suitable for making posterior teeth. A similar procedure to that described with reference to FIG. 1 may be adopted for the manufacture of anterior teeth.

These procedures are particularly suitable for use when it is desired to use pigments which may not be stable at temperatures of 1500° C. or above, and therefore cannot be directly incorporated in recrystallized alumina components. Teeth made by these procedures may be used both for bridge pontics and on artificial dentures.

Nonparallel bridge abutments may be connected by the use of a bridge pontic reinforced by twin parallel bore alumina tubing 40, as shown in FIG. 2A. FIG. 2 illustrates the basic principles of this technique.

The oval shaped twin bore alumina tubing 40 is imbedded in an artificial aluminous porcelain bridge pontic to form the anchorage area for the artificial tooth forming the pontic. The dimensions of the tubing 40 should be such that they allow an adequate thickness of veneer porcelain 41, and aluminous porcelain 42, in order to obtain the proper tooth shape and achieve an aesthetic appearance. The wall thickness of the tubing 40 should not exceed one millimetre.

In order to mount the pontic in the mouth, adjoining non-parallel abutment teeth 48 are prepared to receive crowns 43, which are adapted for independent connection to the tubing 40 by attaching thereto by soldered joints 44 gold frameworks 45 separated by a buttjoint 46 and carrying spigots 47 prepared to be a precise fit in the bores of the tubing 40.

The crowns 43, each with their associated frameworks 45 are then cemented independently on to the prepared abutment teeth 48. A bridge can then be completed by cementing the bores of the alumina tube 40 on to the spigots 47 of the gold framework 45 thus providing a strong linkage between the two non-parallel bridge abutments. Clinical testing has shown that the precision fit of the gold casting in the alumina twin bore tubing together with the cement seal has proved more than adequate in providing a firm and permanent linkage.

Although in the embodiment illustrated, the crowns 43 are of gold, since the technique is particularly applicable to molars where aesthetics are of lesser importance, one or both crowns may be prepared with a covering porcelain layer except for the abutment surfaces.

Recrystallized alumina elements may be used for the construction of post crowns as illustrated in FIG. 3. A 1 to 1.5 millimetre diameter stainless steel post 10 is fitted to the root canal 11 of an existing tooth, and recrystallized alumina tube 12 is ground to fit over the exposed portion 13 of the post. The post 10 and tube 12 may be made in various sizes but the tube should fit the post accurately. An impression is taken by any standard dental procedure of the root surface 14 with only the post in position. A copper or silver die is made up from the impression and a platinum matrix is adapted to the root surface 14. A dental crown is constructed by firing an aluminous porcelain body 15 onto the alumina tube 12 in the die. Feldspathic dental enamel 16 is applied at a second firing. The alumina tube 12 gives reinforcement to the porcelain 15 and eliminates the necessity of casting a gold core for the crown.

A reinforced porcelain jacket crown containing a preformed recrystallized alumina backing may be made by manufacturing a copper or silver model stump of the jacket crown and forming a platinum matrix using the model stump. A thin coat of pigmented aluminous porcelain is then applied to the palatal aspect of the platinum matrix and a preformed alumina backing vibrated into position. The body colour is built up onto the remainder of the matrix with aluminous porcelain and the whole is then fired to produce a jacket crown. Feldspar enamel is then applied to the appropriate surfaces of the crown and the whole refired: the resultant crown is shown in FIG. 4 in position on an existing human tooth 20, the jacket crown comprising the pigmented aluminous porcelain layer 21 which lay against the palatal aspect of the platinum matrix, the preformed alumina backing 22, the pigmented aluminous porcelain 23 and the feldspar enamel 24. The crown described in this example has the advantage of strength on the palatal surface 25 which is the most common site for fracture during mastication. A similar technique may be adopted substituting a conventional feldspathic porcelain of matching thermal expansion for the aluminous porcelain.

An interior veneer facing for bridgework may be made up as illustrated in FIG. 5. An alumina backing 30 is provided with a dovetail 31 by which it may be attached to the bridgework and a layer 33 of suitably pigmented aluminous porcelain fired to its anterior surface 32, after which a veneer 34 is applied over the aluminous porcelain.

The alumina elements used in the invention may be nickel plated by the steps of impregnating the surface of a recrystallized alumina component with molybdenum paint, firing the paint on to the surface of the alumina at a temperature exceeding 1600° C., nickel plating the resultant surface using standard plating methods, and then soldering gold backings onto the nickel plating, again by conventional methods.

Moreover, as a result of the refractory nature of recrystallized alumina it has been found possible to cast dental gold directly on to this material. Bridge pontics are constructed using recrystallized alumina cores covered with aluminous porcelain having a firing temperature in excess of 1100° C. Wax is adapted to the palatal retention areas of the preformed alumina core and a gold casting is made by standard dental procedure using the wax impressions. This technique may be used to construct one piece bridgework in which the abutment inlays and porcelain, alumina element reinforced, pontic may be joined with a gold casting made by the wax process.

Restorations according to the invention may be mounted or assembled using either of the above procedures, or crowns in accordane with the invention may be cemented in place in the mouth or prepared stumps or posts in known manner.

The recrystallized alumina elements used in the invention are basically colourless, although natural tooth shades can be produced by the use of suitable pigments. It is found that they do not adversely affect the aesthetics of an overlying layer of porcelain, even when this is very thin, and that the element can extend to or near to the incisal edges of teeth and crowns without adverse affects on aesthetics. An excellent bond is produced when dental porcelains are fired onto the alumina element with the result that not only is force applied to the porcelain through the alumina well distributed, but the porcelain itself is reinforced against fracture. The alumina elements are unaffected by oral fluids, can readily withstand the firing temperatures necessary for dental porcelains without fusion, distortion or damage due to thermal shock, and have a coefficient of expansion similar to that of dental porcelains. Because of the ease and excellence of their bond with the porcelain, the fusion bond can be relied upon without resort to deliberately shaping the elements to provide a degree of mechanical retention, thus enabling a relatively small range of simply shaped preformed elements to suffice for most applications, although adjustments may readily be made using normal grinding techniques. The elements are of course much cheaper than noble metal reinforcements.

As will be apparent to persons skilled in the art, various modifications and adaptations of the structures above-described are possible without departure from the spirit and scope of the invention; for example, the recrystallized alumina elements could be replaced by elements of other recrystallized refractory oxides such as zirconia or titania which have similar physical properties.

What is claimed is:

1. An artificial tooth comprising a preformed core of recrystallized alumina adapted to support the tooth on a denture plate or bridge substructure within the mouth, a layer of dental porcelain fused thereto and having an external contour defining a tooth shape, and a layer of dental veneer covering at least part of the porcelain layer.

2. An artificial tooth according to claim 1 wherein the dental porcelain is aluminous porcelain.

3. A post crown comprising a tube of recrystallized alumina having an internal bore adapted to receive the head of a metal post fitted to the root canal of an existing human tooth, a layer of dental porcelain fused to those surfaces of the tube exposed when it is fitted to the tube and having an external contour defining the shape of a tooth crown, and a dental veneer covering at least part of that portion of the surface of the porcelain layer defining the shape of the tooth crown and the root surface of the prepared tooth.

4. A post crown according to claim 3, wherein the dental porcelain is aluminous porcelain.

5. A jacket crown comprising a body of fused dental porcelain having an external contour defining the shape of a tooth crown and an internal contour defining the shape of a prepared stump of a human tooth, said porcelain being fused to a preformed backing of recrystallized alumina imbedded at the palatal face of the body, and said body being at least partially overlaid externally by a layer of dental veneer.

6. A jacket crown according to claim 5, wherein the dental porcelain is aluminous porcelain.

7. A dental restoration comprising a preformed element of recrystallized alumina, imbedded in a body of dental porcelain fused thereto, said body having an external contour defining at least part of a tooth shape, said element being situated in said body in a position interposed between a principal source of rupturing forces applied to the restoration when in position in the mouth and the main mass of said porcelain body.

8. Dental restorations according to claim 7, wherein the dental porcelain is aluminous porcelain.

9. Dental restorations according to claim 7, wherein a layer of dental veneer is fused onto at least a part of the tooth shape defining surfaces of the porcelain body.

10. A dental restoration according to claim 7, wherein the porcelain body is supported in the mouth through the alumina element, the latter being supported on a gold backing.

11. An artificial tooth according to claim 2, forming a pontic for completing a bridge between two abutment teeth, wherein the alumina core is formed by twin parallel bore alumina tubing and the bores of the tubing are adapted independently to receive spigots carried by frameworks supported by the abutment teeth.

References Cited

UNITED STATES PATENTS

| | | | |
|---|---|---|---|
| 3,004,343 | 10/1961 | Rydin | 32—13 |
| 3,052,983 | 9/1962 | Weinstein et al. | 32—12 |
| 3,069,773 | 12/1962 | Saffir | 32—8 |

ROBERT PESHOCK, Primary Examiner

PO-1050
(5/69)

UNITED STATES PATENT OFFICE
CERTIFICATE OF CORRECTION

Patent No. 3,541,688                     Dated  November 24, 1970

Inventor(s)   John Walford McLean et al

It is certified that error appears in the above-identified patent and that said Letters Patent are hereby corrected as shown below:

Insert at the bottom of the heading: "claims priority of British Application No. 18192/63, filed May 8, 1963.

Signed and sealed this 13th day of April 1971.

(SEAL)
Attest:

EDWARD M. FLETCHER, JR.
Attesting Officer

WILLIAM E. SCHUYLER, JR.
Commissioner of Patents